(12) United States Patent
Cadek et al.

(10) Patent No.: US 7,947,246 B2
(45) Date of Patent: May 24, 2011

(54) ELECTROCHEMICAL CAPACITOR, CARBONIZED BIOPOLYMERS AND CARBONIZATION PROCESS

(75) Inventors: Martin Cadek, Augsburg (DE); Francois Beguin, Olivet (FR); Encarnacion Raymundo-Pinero, Orleans (FR)

(73) Assignees: SGL Carbon SE, Wiesbaden (DE); Centre National de la Recherche Sientifique, Paris (FR); L'Universite d'Orleans, Paris (FR)

( * ) Notice: Subject to any disclaimer, the term of this patent is extended or adjusted under 35 U.S.C. 154(b) by 252 days.

(21) Appl. No.: 12/184,662

(22) Filed: Aug. 1, 2008

(65) Prior Publication Data

US 2009/0052117 A1    Feb. 26, 2009

Related U.S. Application Data

(63) Continuation of application No. PCT/EP2007/050890, filed on Jan. 30, 2007.

(30) Foreign Application Priority Data

Feb. 1, 2006   (EP) .................................... 06002103

(51) Int. Cl.
*C01B 31/00*    (2006.01)
*H01B 1/04*    (2006.01)
(52) U.S. Cl. .................................... 423/445 R; 252/502
(58) Field of Classification Search .............. 423/445 R, 423/460; 502/416–438; 252/502
See application file for complete search history.

(56) References Cited

U.S. PATENT DOCUMENTS

| | | | | |
|---|---|---|---|---|
| 1,502,592 A | * | 7/1924 | Sauer | 502/422 |
| 3,652,902 A | * | 3/1972 | Hart et al. | 361/502 |
| 4,125,392 A | * | 11/1978 | Primo | 504/101 |
| 4,816,242 A | * | 3/1989 | Venner et al. | 423/447.6 |
| 5,242,879 A | | 9/1993 | Abe et al. | |
| 5,338,462 A | * | 8/1994 | Abe et al. | 210/757 |
| 6,143,213 A | * | 11/2000 | Furukawa et al. | 264/29.1 |
| 7,731,931 B2 | * | 6/2010 | Shiflett et al. | 423/460 |
| 2004/0167019 A1 | * | 8/2004 | Liang et al. | 502/433 |
| 2005/0252373 A1 | * | 11/2005 | Shiflett et al. | 95/90 |

FOREIGN PATENT DOCUMENTS

| | | |
|---|---|---|
| EP | 0 490 317 A1 | 6/1992 |
| GB | 1118626 | 7/1968 |
| JP | 8-26713 A | 1/1996 |

OTHER PUBLICATIONS van der Kaaden, et al., Comparison of Analytical Pyrolysis Techniques in the Characterization of Chitin, Anal. Chem. 1984; 56: 2160-2165.*
International Search Report, dated May 7, 2007.

* cited by examiner

*Primary Examiner* — Stanley S. Silverman
*Assistant Examiner* — Daniel C. McCracken
(74) *Attorney, Agent, or Firm* — Laurence A. Greenberg; Werner H. Stemer; Ralph E. Locher

(57) ABSTRACT

A carbon material suitable for the preparation of electrodes for electrochemical capacitors is obtained by single-stage carbonization of biopolymers with a large content of heteroatoms. Neither addition of an activating agent during carbonization nor subsequent gas phase activation is necessary. Several biopolymers which are available by extraction from seaweed are suitable precursors. Alternatively, the seaweed containing such biopolymers is carbonized directly.

16 Claims, 2 Drawing Sheets

ELECTROCHEMICAL CAPACITOR, CARBONIZED BIOPOLYMERS AND CARBONIZATION PROCESS

CROSS-REFERENCE TO RELATED APPLICATION

This is a continuation, under 35 U.S.C. §120, of copending international application No. PCT/EP2007/050890, filed Jan. 30, 2007, which designated the United States; this application also claims the priority, under 35 U.S.C. §119, of European patent application No. EP 06002103.7, filed Feb. 1, 2006; the prior applications are herewith incorporated by reference in their entirety.

BACKGROUND OF THE INVENTION

Field of the Invention

The present invention relates to carbonized biopolymers and carbonized seaweeds, which are suitable as electrode material in electrochemical capacitors.

Electrochemical capacitors are devices which store electrical energy by separation of charged species in an electrical double layer at the electrode/electrolyte interface. The electrodes of such a capacitor have to be electrically conductive and electrochemically inert over a wide range of voltage. Furthermore, even over a large number of charging/discharging cycles the capacitive behavior must not significantly degrade. A high surface area of the electrode material is desirable since the capacitance is proportional to the electrode/electrolyte interface area. Activated carbons are the most widely used electrode material for electrochemical capacitors because of their high surface area and high electronic conductivity. Beside carbon, activated carbon contains small amounts of oxygen and hydrogen chemically bound in functional groups like hydroxy, carbonyl, carboxyl, quinone and ether groups.

Commonly, activated carbon is obtained by gas activation of a carbonaceous material. The material is treated at a temperature in the range from 800° C. to 1000° C. under an atmosphere containing an oxidizing gas or a mixture of oxidizing gases, such as steam or carbon dioxide. The activation process is strongly endothermic. During activation, some of the carbonaceous material is decomposed, producing numerous extremely fine pores or cracks. Another method commonly referred to as chemical activation uses dehydrating agents like caustic potash solution, phosphoric acid or zinc chloride, which are added to a carbon precursor like sawdust, peat, cellulose or biomass of vegetable origin, see for example, European patent publication EP 0 329 251. After carbonization at a temperature in the range 400° C. to 1000° C. and removal of the activation agent, a porous carbon material is obtained.

The large surface area of activated carbons is associated to a large amount of pores with a diameter of a few nanometers only which are not all accessible for the electrolyte. Therefore the increase of capacitance obtainable by means of an increase of the electrode surface area is limited. Furthermore, the more porous the electrode material the lower its electronic conductivity and density. Since the volumetric capacitance is directly proportional to the density of the electrode material, a high density is a prerequisite for the realization of small and compact energy storage devices.

The amount of charge storable in electrochemical capacitors increases significantly if additional Faradaic electrode processes occur beside the pure electrostatic attraction across the electrochemical double layer. The contribution to the overall capacitance originating from Faradaic electrode processes is commonly referred to as pseudo-capacitance. Typical pseudo-capacitive (i.e. Faradaic) electrode processes are, e.g., electrosorption of hydrogen or metal adatoms or redox reactions of electroactive species. Electrochemical capacitors based on this effect are commonly referred to as supercapacitors or pseudo-capacitors.

In general, it is possible to increase the capacitance of carbon electrodes by adding an electroactive species like a conductive polymer or a transition metal oxide. However, the electrochemical behavior of conducting polymers is often subject to significant degradation upon repeated charging and discharging, and transition metal oxides offering a large pseudo-capacitance like ruthenium dioxide are expensive.

An alternative route to carbon-based electrode materials with increased pseudo-capacitance consists in the formation of electroactive surface species (surface functional groups) at the electrode surface. For instance functional groups containing oxygen atoms (e.g. hydroxy, quinone, carbonyl, carboxyl, and ether groups) or other heteroatoms such as nitrogen can undergo Faradaic redox reactions resulting in a pseudo-capacitance. Such surface modifications can be induced by acid or plasma treatment of the carbon electrode surface. However surface modifications obtained in this way appear to be not stable upon charge/discharge cycling. Another method to obtain a carbon material with some oxygen-containing surface functional groups is the activation process described above.

European patent publication EP 0 490 317, and its counterpart U.S. Pat. No. 5,242,879, discloses activated carbon materials comprising from 1 to 5% by weight of nitrogen, from 3 to 30% by weight of oxygen and from 40 to 95% by weight of carbon, and having an average pore radius of from 1,5 to 3,0 nm with the proviso that mesopores occupy at least 50% by volume based on the total pore volume. The materials are useful as catalysts for the decomposition of hydrogen peroxide, hydrazines or water pollutants such as quarternary ammonium salts, organic acids, sulfur-containing compounds and the like. Implementation in electrochemical capacitors is not disclosed.

The activated carbon materials according to the above EP 0 490 317 and U.S. Pat. No. 5,242,879 may be prepared by subjecting proteins or protein-containing sludge or waste materials containing proteins to a treatment comprising carbonization and subsequent activation. As examples of proteins and protein-containing sludge or waste materials used for the production of the activated carbon materials, yeasts such as baker's yeasts, chlorella and the like; microbial proteins such as bacteria, algae, waste microbial materials obtained in yeast fermentation steps for the productions of beers or medicines, and fermentation residues obtained in amino acid fermentation operations, etc.; sludge obtained as remnants from biologically activated sludge used in treatments of industrial waste water, excrement, domestic waste water were mentioned. Furthermore, it is possible to use animal proteins such as fish, animal meat and blood, etc.; vegetable proteins such as beans e.g., soybeans and fatty soybeans, embryo buds of wheat and rice, etc. The use of such cheap starting materials is a significant economical advantage.

The carbonization treatment is carried out at a temperature of from 150° C. to 600° C. for a period of time of from several minutes to several hours, while air, nitrogen, gaseous carbon dioxide or a mixture thereof is introduced. During carbonization, care has to be taken to avoid fusion of the powdered starting materials, because then it is difficult to obtain a product which is so designed to form desired pores therein. After this carbonization treatment, an activation treatment is carried out in an atmosphere consisting mainly of steam, gaseous carbon dioxide and oxygen at a temperature of from 700° C. to 1100° C. for a period of time of from several minutes to several hours.

As pointed out in EP 0 490 317 and U.S. Pat. No. 5,242,879 the composition and pore texture of the carbon materials is obtained as the result of carbonization with a subsequent activation process. Therefore, the activation process is required and necessary in preparing the carbon materials disclosed there.

Since activation is an energy and time-consuming process, it is desirable to obtain a carbon material with a content of oxygen and nitrogen in the range as specified in EP 0 490 317 and U.S. Pat. No. 5,242,879 without activation.

SUMMARY OF THE INVENTION

It is accordingly an object of the invention to provide carbonized biopolymers, which overcome the above-mentioned disadvantages of the heretofore-known devices and methods of this general type and which provides for a suitable carbon material without activation.

With the foregoing and other objects in view there is provided, in accordance with the invention, a biopolymer product, comprising an electronically conductive carbonized biopolymer with a content of heteroatoms in the carbonized biopolymer of at least 6 atom %.

Surprisingly, it was found that certain biopolymers rich in heteroatoms can be transformed into carbon materials with a large amount of heteroatom-containing surface functional groups by a single stage carbonization process without an additional activation. Although the specific surface area of these carbonized biopolymers might be relatively small, they exhibit high gravimetric and volumetric capacitance and are therefore very suitable as electrode materials for electrochemical capacitors with aqueous or organic electrolyte.

Thus the present invention provides carbonized biopolymers with a content of heteroatoms (i.e. atoms other than carbon and hydrogen), which can be involved in Faradaic electrode processes, of at least 6 atom %.

Preferably the carbonized biopolymer has an oxygen content of at least 6 atom %, or a sum of the contents of nitrogen and oxygen of at least 8 atom %. The gravimetric capacitance of those carbonized biopolymers may reach more than 100 F/g. Preferably, the volumetric capacitance is at least 100 F/cm$^3$.

Furthermore, the present invention provides a method to obtain these carbonized biopolymers.

The precursors of the carbonized biopolymers according to the present invention are biopolymers with a high content of heteroatoms, which can be carbonized at relatively low temperatures (up to 800° C.) in a single stage process with a significant amount of heteroatoms remaining in the carbonized material. With the biopolymers suitable for the present invention, carbonization usually spreads over a wide temperature range with several decomposition stages at different temperature levels associated with weight loss. At the lower temperature levels thermally induced split-off processes like dehydration and decarboxylation occur, while at the higher temperature levels further thermal degradation of the polymer takes place. To achieve carbonized biopolymers with the desired content of heteroatoms, it is important to carry out the carbonization at a temperature below the highest temperature level of thermally induced weight loss of the biopolymer. The suitable temperature range can be estimated by thermogravimetric analysis. Usually, the precursors of the present invention are carbonized at temperatures between 550° C. and 800° C. under inert atmosphere for a few hours, mostly around 3 hours.

In contrast to the carbonization behavior of the biopolymers suitable for the present invention, there are other oxygen-rich biopolymers like cellulose which upon carbonization do not form an oxygen-rich (i.e. heteroatom-rich) The carbonized biopolymer according to the present invention, because they decompose in a narrow temperature range. For instance cellulose decomposes within the small temperature range between 300° C. and 350° C., finally resulting in a char with a small oxygen content (below 5 atom %) although the precursor cellulose has an oxygen content between 40 and 50 atom %. Those biopolymers are not suitable precursors for the present invention.

Carbonization of the biopolymers according to the present invention is carried out in a single stage process without the subsequent gas activation known from the prior art and without addition of any chemical activation agent. Therefore, in contrast to the carbon materials disclosed in EP 0 329 251 and EP 0 490 317, the carbonized biopolymers of the present invention do not belong to the class of activated carbon materials.

It was found that several biopolymers which are contained in seaweed, especially in red or brown seaweed or agarophytes, are very suitable precursors for the carbon materials of the present invention. Examples of such biopolymers are alginic acid, alginate salts, agar and carrageenan (iota and kappa), which are commercially available.

The polymers can be extracted from the seaweed before carbonization. Alternatively, the raw seaweed containing such polymers can be used directly as precursors without previous extraction of the biopolymer. Thus, by carbonization of carrageenan-rich red seaweed like *Hypnea Musciforme* or of alginate rich brown seaweed, such as *Lessonia Nigrescens* or of agar-rich seaweed, carbonized biopolymers suitable as electrode material for electrochemical capacitors can be produced. This route to the inventive carbonized biopolymers is very favorable for economic reasons, since the extraction process is omitted. Another suitable precursor biopolymer is chitin.

The carbonized biopolymers or carbonized seaweed can be formed into electrodes from a mixture of the carbonized biopolymer or carbonized seaweed and a suitable binder, either by casting the mixture on current collectors or by pressing the mixture into the desired shape and assembling with current collectors. However, electrode production from activated carbon and assembling of electrochemical capacitors containing such electrodes is known in the art, and the same technique is used for the carbonized biopolymers and carbonized seaweed of the present invention. Thus no further details regarding electrode manufacturing need to be given.

The gravimetric capacitance of the carbonized biopolymers or carbonized seaweeds of the present invention is at least 100 F/g, preferably above 180 F/g. With commercially available activated carbons commonly used in electrochemical capacitors, generally less than 200 F/g are achieved. Nevertheless, even for those carbonized biopolymers or carbonized seaweed of the present invention with a gravimetric capacitance somewhat below that of state-of-the-art activated carbons, there is still the major advantage of the more facile preparation which avoids the energy- and time consuming activation process.

Another significant advantage over activated carbon is the lower pore volume of the carbonized biopolymers and carbonized seaweeds of the present invention, which results in a higher density and therefore a higher volumetric capacitance.

It is assumed that a significant pseudo-capacitance contributes to the large overall capacitance of the electrodes made of the carbonized biopolymers or carbonized seaweed of the present invention. The high amount of oxygen or other heteroatom-containing surface functional groups is assumed to be the origin of the pseudo-capacitive (Faradaic) character of the electrochemical behavior. The heteroatom content of the carbonized biopolymers and carbonized seaweed as detected by the XPS technique is at least 6 atom %. Some preferred carbonized biopolymers have an oxygen content of at least 6 atom %, or a sum of the contents of nitrogen and oxygen of at least 8 atom %. Preferably the oxygen content is at least 8 atom %.

The contribution of the pseudo-capacitance allows for a high overall capacitance even when the electrode surface area is not very high, i.e. the porosity is not very developed. For most of the carbonized biopolymers and carbonized seaweeds of the present invention, the BET specific surface area as obtained from nitrogen adsorption measurements is between a tenth and a half of the BET specific surface area of state-of-the-art activated carbon. The pores are mainly ultra-micropores with a diameter equal to or below 0.7 nm.

Despite the lower specific surface area, the gravimetric capacitance of most carbonized biopolymers and carbonized seaweed is in the same order of magnitude as that of state-of-the-art activated carbon.

Due to the lower pore volume compared to activated carbon, the carbonized biopolymers and carbonized seaweeds of the present invention have a higher density and, therefore, a higher volumetric capacitance, allowing for smaller and more compact energy storage devices. With carbonized biopolymers or carbonized seaweeds of the invention, volumetric capacitances of at least 100 F/cm$^3$ were obtained, while the volumetric capacitance of conventional state-of-the-art activated carbon is below 100 F/cm$^3$, due to the low density resulting from the large pore volume of activated carbon.

The maximum cell voltage for reversibly charging the capacitors with electrodes containing the carbonized biopolymers or carbonized seaweeds of the present invention is 1.0 V in aqueous acidic electrolyte. In contrast, with commercially available activated carbon electrodes, the maximum voltage is only between 0.6 and 0.7 V. As a consequence of the higher maximum voltage, the amount of energy which can be accumulated in electrochemical capacitors based on carbonized biopolymers or carbonized seaweeds of the present invention is higher than with conventional state-of-the-art activated carbon. Indeed, with carbonized biopolymers and carbonized seaweeds of the present invention a gravimetric energy density of more that 8 Wh/kg was achieved.

With most of the carbonized biopolymers and carbonized seaweeds of the present invention, the capacitance did not significantly degrade over several thousands of charge/discharge cycles, thus meeting another important prerequisite for application in electrochemical capacitors.

The carbonized biopolymers and carbonized seaweeds of the present invention can also be used for electrochemical capacitors with an organic (i.e. non-aqueous) electrolyte.

Beside the application in electrochemical capacitors, at least those of the carbonized polymers and carbonized seaweeds which exhibit a BET specific surface area in the range of at least 45% of that of state-of-art activated carbon are suitable for other technical applications typical for activated carbon. Those applications relate to the fields of gas adsorption and gas storage, separation or purification of gases (for example air), purification of water etc.

Other features which are considered as characteristic for the invention are set forth in the appended claims.

Although the invention is described herein as embodied in carbonized biopolymers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and examples, and with reference to the drawing figures.

DESCRIPTION OF THE PREFERRED EMBODIMENTS OF THE INVENTION

Precursor Biopolymers

Several commercially available oxygen-rich biopolymers (alginates and carrageenan, see table 1) extracted from seaweeds were carbonized. Alginates are produced from brown seaweed. Carrageenan is a collective term for polysaccharides prepared by alkaline extraction (and modification) from red seaweed.

Furthermore, several kinds of seaweeds with a large content of these biopolymers were directly carbonized. *Lessonia Nigrescens* is an alginate-rich seaweed, while *Hypnea Musciforme* and *Meristotheca Senegalensis* have a large carrageenan content.

Another promising precursor biopolymer is chitin. Chitin is an unbranched polymer of N-Acetyl-D-glucosamine. It is found in fungi and seaweed, and it is the principal component of arthropod and lower animal exoskeletons, e.g., insect, crab, and shrimp shells. It may be regarded as a derivative of cellulose, in which the hydroxyl groups of the second carbon of each glucose unit have been replaced with acetamido (—NH(C=O)CH$_3$) groups.

Comparison Material

For comparison the activated carbon Maxsorb®, commercially available from the Japanese company Kansai Netsukagaku Kabushiki Kaisha, was studied. Maxsorb is microporous with a high BET specific surface area of 2500 m$^2$/g and is generally considered as one of the most performing activated carbon materials for electrochemical capacitors.

Carbonization Behavior

The carbonization temperature for each precursor is given in table 1. Carbonization was carried out under argon or nitrogen atmosphere during 3 hours. After carbonization, the carbonized material was washed first with 5 mol/l hydrochloric acid, and then with distilled water.

Figure 1:
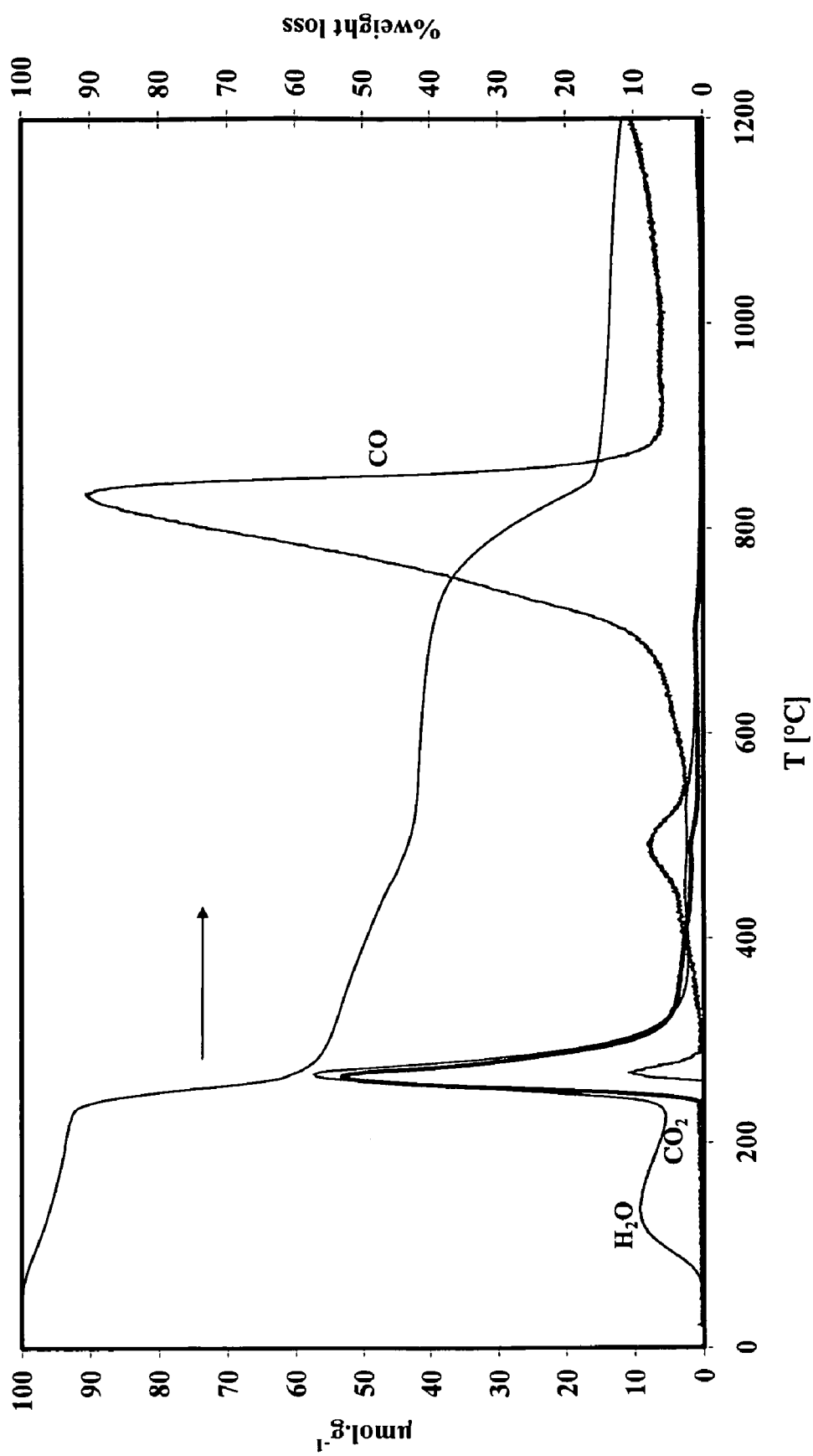
FIG. 1 is graph illustrating the results of thermo-gravimetric analysis of a typical precursor biopolymer which can be carbonized according to the present invention.

To give an example for the typical carbonization behavior of biopolymers suitable as precursors for the carbonization process of the present invention, the result of the thermogravimetric analysis of sodium alginate is displayed in FIG. 1. Thermogravimetric analysis (TGA) in an inert gas flow was coupled to mass spectroscopy. The different weight loss processes as a function of temperature are associated with the evolution of volatile compounds. The small weight loss up to 200° C. is related to the desorption of adsorbed water. The pronounced weight loss around 250° C. is associated to the evolution of steam and carbon dioxide, which corresponds to dehydration and decarboxylation of the material, respectively. The next two thermally induced weight losses, in the ranges between 350° C. and 500° C. and between 700° C. and 900° C., are due to the further thermal degradation of the polymer. Within the last stage of thermally induced weight loss, a significant release of carbon monoxide takes place which might be associated to the decomposition of quinone groups. Since quinone groups are involved in Faradaic redox processes responsible for the pseudo-capacitance, their decomposition has to be avoided. Therefore, carbonization of sodium alginate and alginate-rich seaweed was performed at 600° C. in a tubular furnace under argon flow.

The carbonization behavior of carrageenan follows a qualitatively similar pattern, but shifted to somewhat higher temperatures. Therefore, carbonization of carrageenan and carrageenan-rich seaweed was performed at 750° C.

Specific Surface Area and Porosity

As can be concluded from the BET specific surface area data shown in table 1, the porosity of the carbonized biopolymers and carbonized seaweed of the present invention is less developed than for the state-of-the-art activated carbon, since the values of the specific surface area measured with the BET method are only between 10 and 50% of that of the activated carbon.

The carbonized biopolymers and carbonized seaweeds are ultra-microporous in nature.

Regarding porosity, the definitions developed by the IUPAC are applicable here. That is, pores with a diameter of less than 2 nm are referred to as micropores, pores with diameters between 2 nm and 50 nm are referred to as mesopores, and pores with a diameter higher than 50 nm are referred to as macropores.

The characterization of the pore texture is done by gas adsorption with two different gases, nitrogen at 77K and carbon dioxide at 273K. The nitrogen adsorption isotherm is related to pores in the upper range of micropores (diameter larger than 0.7 nm) and mesopores (whole range), while the carbon dioxide isotherm is related to the ultra-micropores (diameter equal to or less than 0.7 nm). Roughly the pore volume obtained from the nitrogen adsorption corresponds to the total micro- and mesoporosity and the pore volume obtained from the carbon dioxide adsorption isotherm corresponds to the ultra-microporosity.

In most cases the values obtained from the carbon dioxide adsorption isotherms are close to or larger than the values obtained form the BET isotherm. Thus most of the pores belong to the range of ultra-micropores with a diameter around or below 0.7 nm.

For some of the carbonized polymers (carbonized carrageenan and carbonized carrageenan-rich seaweed), the BET specific surface area is in the range of more than 45% of that of conventional state-of-the-art activated carbon. This high specific surface area in combination with the pronounced ultra-microporosity renders these materials suitable for other technical applications typical for activated carbon. Those applications relate to the fields of gas adsorption and gas storage, separation or purification of gases (for example air) and purification of water.

Content of Oxygen and Nitrogen

The values of the oxygen and nitrogen content detected by XPS analysis are given in table 1.

For those carbonized biopolymers which do not contain a significant amount of nitrogen (alginate and carrageenan), the oxygen content is above 6 atom %. For those carbonized biopolymers and carbonized seaweeds which contain both kinds of heteroatoms, the sum of their contents is above 8 atom %. Thus all of the carbonized biopolymers and carbonized seaweeds exhibit a higher content of heteroatoms than the state of the art activated carbon Maxsorb, which contains only 4.2 atom % of oxygen and no nitrogen.

The higher content of heteroatoms results in a significant pseudo-capacitive contribution to the overall capacitance, as will be shown below. However, the capacitance does not directly correlate with the content of oxygen and nitrogen. Beside the influence of the number of heteroatoms related with the pseudo-capacitive contribution, there is a wide variation of the specific electrode surface area, resulting in a corresponding wide variation of the purely electrostatic contribution to the overall capacitance. The overall capacitance is determined by both the pseudo-capacitive contribution related to the number of heteroatoms and the purely electrostatic contribution influenced by the electrode surface area.

Electrochemical Behavior

Electrodes were prepared by pressing a mixture of the carbonized biopolymer or carbonized seaweed and a binder (PVDF, 10 wt %) into flat pellets of 1 cm$^2$ area. Two-electrode symmetric capacitors were assembled using 1 mol/l $H_2SO_4$ as electrolyte with a separator made of glass fibers and current collectors made of gold, and studied using several electrochemical techniques commonly applied in testing of electrochemical capacitors.

Figure 2:
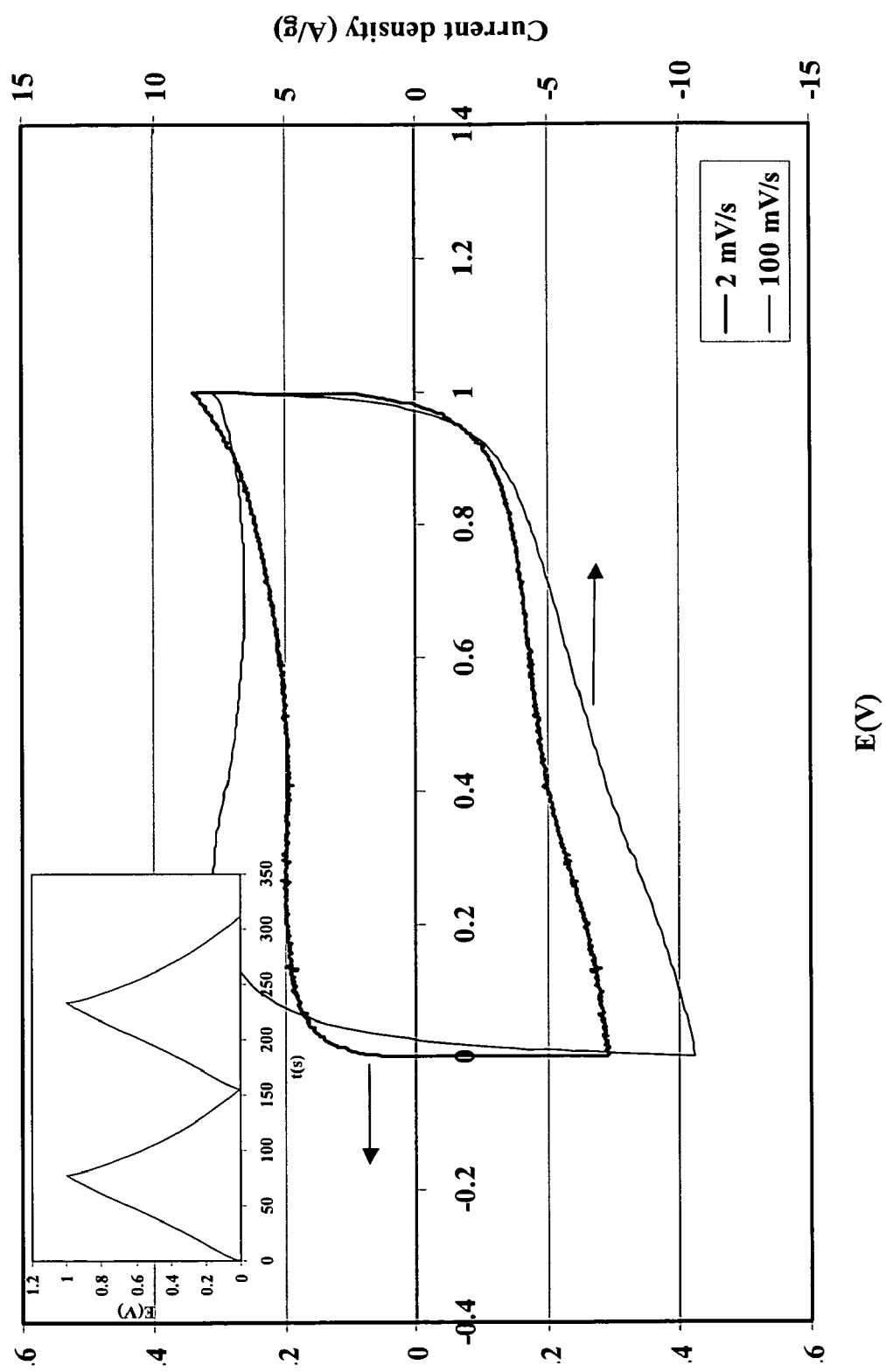
FIG. 2 shows the cyclic voltammogram of a two electrode capacitor prepared from a The carbonized biopolymer according to the present invention.

FIG. 2 shows the cyclic voltammograms of a capacitor with two electrodes made of carbonized sodium alginate in 1 mol/l $H_2SO_4$ at scan rates of 2 mV/s and 100 mV/s. The cyclic voltammogram was recorded in the two-electrode technique. The basically rectangular shape of the cyclo-voltammetric curve at 2 mV/s in the voltage window between 0 and 1.0 V is typical of a capacitive and reversible behavior. The presence of a small hump during the cathodic sweep at voltages lower than 0.4 V indicates that some Faradaic redox processes contribute to the electrochemical behavior of the material. The high amount of oxygen detected by XPS is considered to be the origin of the pseudo-capacitive (Faradaic) behavior. FIG. 2 also shows that the capacitive behavior of the material is reproduced even at the high scan rate of 100 mV/s, indicating that the electronic conductivity is high enough to assure a fast charge transfer. The high conductivity allows to prepare the electrodes without any conductivity additive.

The galvanostatic cycling of the same capacitor between 0 V and a maximum voltage of 1.0 V demonstrates a capacitive behavior with almost symmetric charge-discharge curves (FIG. 2, inset). The small deviation from linearity is typical of a pseudo-capacitive contribution.

The cyclic voltammograms and galvanostatic cycling curves of the capacitors containing the other carbonized biopolymers or carbonized seaweeds given in table 1 are very similar to that of the capacitor containing carbonized sodium alginate shown in FIG. 2.

The capacitance C could be calculated from the cyclic voltammograms according to the formula $$C = \frac{i}{v} = i * \frac{dt}{dE}$$

wherein i is the current in the rectangular region and v is the scan rate (variation of voltage with time dE/dt) at which the cyclic voltammogram was recorded.

However, in the case of pseudo-capacitive behavior significant deviations from the rectangular shape of the cyclic voltammogram are present due to the humps associated to Faradaic processes. Thus, for higher accuracy, the capacitance C was calculated from the galvanostatic cyclic experiments according to the formula $$C = i * \frac{dE}{dt}$$

wherein i is the current charging the electrode (per gram of carbonized biopolymer or seaweed), dE is the variation of the voltage during charging and dt is the time duration of charging. A current i of 200 mA/g was applied in the galvanostatic cycling experiments, and the voltage E was cycled between 0 and 1.0 V.

The gravimetric capacitance is between 102 F/g for carbonized alginic acid and 255 F/g for carbonized *Lessonia Nigrescens*. The gravimetric capacitance of the state-of-the-art activated carbon is 180 F/g, which is in the same range, but obtained as a result of the activation process, which is omitted with the present invention.

From table 1 it can be seen that the capacitance of the carbonized biopolymers and carbonized seaweeds does not correlate with the specific surface area. Carbonized alginic acid, which is the carbonized biopolymer with the lowest gravimetric capacitance, has a specific surface of only 10% of that of Maxsorb, but its gravimetric capacitance reaches more than 50% of that of Maxsorb. Carbonized *Lessonia Nigrescens*, which has the highest volumetric capacitance (40% above that of Maxsorb) has a specific surface area of only around ⅓ of that of Maxsorb. The carbonized biopolymers and carbonized seaweeds with the largest specific surface areas (carbonized carrageenan and carbonized carrageenan-rich seaweed) reach at least ⅔ of the capacitance of Maxsorb, although their specific surface area is only half of that of activated carbon.

The lack of correlation of the capacitance with the specific surface area is a further indication that a significant contribution of the capacitance does not originate from the purely electrostatic double layer charging, but from a Faradaic redox process with heteroatoms involved.

The volumetric capacitance was obtained by multiplication of the gravimetric capacitance with the density of the electrode. The density was calculated from the mass of the electrode and the volume as defined by the geometric dimensions of the electrode. Due to the lower pore volume, the density of the electrodes made of carbonized biopolymers or carbonized seaweeds of the present invention is larger than that of activated carbon. For example, the density of the electrode made of carbonized sodium alginate is 0.91 g/cm$^3$, while that of the electrode made of Maxsorb is only 0.47 g/cm$^3$.

It is important to note that even those carbonized biopolymers and carbonized seaweeds with a gravimetric capacitance below that of state-of-the-art activated carbon exhibit a volumetric capacitance which is remarkably higher than that of the activated carbon. This is a major advantage, since the volumetric capacitance is the critical factor for the dimension of a capacitor device designated for storage of a certain amount of charge and, therefore, energy. Thus replacement of Maxsorb by a carbonized biopolymer or carbonized seaweed of the present invention allows for smaller dimensions of a capacitor device with the same amount of stored energy, or for a larger amount of energy to be stored in a device without enlarging its dimensions.

The maximum cell voltage for reversibly charging the capacitors reached 1.0 V for all the tested carbonized biopolymers and carbonized seaweed. In contrast, a maximum voltage of only 0.7 V can be applied with Maxsorb (Table 1). The maximum operating voltage is determined by the stability window of the electrolyte, being theoretically 1.23 V in the case of aqueous electrolyte. However, depending on the nature of the electrodes, the experimental value may more or less differ from 1.23 V. With activated carbons, it reaches generally between 0.6 and 0.7 V in aqueous medium.

The amount of electrical energy E accumulated in a capacitor per mass unit of electrode material (gravimetric energy density) is proportional to the capacitance C and voltage V according to the formula:

$$E = \frac{1}{2}CV^2$$

As a consequence of the higher maximum voltage, the amount of energy which can be accumulated within capacitors containing the carbonized biopolymers of the present invention is higher than with state-of-the art activated carbons (see table 1).

Upon repeated charge/discharge cycling (up to 10000 cycles), the capacitors with carbonized biopolymers or carbonized seaweeds did not exhibit significant capacitance losses. For example, in the capacitor with carbonized sodium alginate, at most 15% of the initial capacitance is lost after 10000 cycles, indicating a long cycle life of the capacitor.

TABLE 1

Precursors, carbonization temperature and test results of carbonized biopolymers and carbonized seaweeds

| Precursor Material | carbonization temperature ° C. | BET surface area m$^2$/g | CO$_2$ ads. surface area m$^2$/g | oxygen content atom % | nitrogen content atom % | gravimetric capacitance F/g | volumetric capacitance F/cm$^3$ | maximum voltage V | Energy density Wh/kg |
|---|---|---|---|---|---|---|---|---|---|
| Sodium alginate | 600 | 270 | 450 | 15 | | 198 | 218 | 1 | 7.4 |
| Potassium alginate | 600 | 452 | 614 | 8.5 | | 198 | | 1 | 6.9 |
| Alginic acid | 600 | 263 | 459 | 13.2 | | 102 | | 1 | 3.5 |
| Lessonia Nigrescens | 600 | 904 | | 9.6 | 2.3 | 255 | 176 | 1 | 8.8 |
| κ-carrageenan | 750 | 1211 | 1256 | 6.6 | | 170 | | 1 | 5.9 |
| Meristotheca Senegalensis | 750 | 1156 | 1204 | 3.9 | 4.5 | 120 | 106 | 1 | 4.2 |
| Hypnea Musciforme | 750 | 1244 | 994 | 5.9 | 4.0 | 140 | 119 | 1 | 4.9 |
| Chitin | 750 | | | 12.5 | 6.7 | 122 | | 1 | 4.2 |
| activated carbon Maxsorb (for comparison) | | 2500 | | 4.2 | 0 | 180 | 85 | 0.7 | 3.4 |

The invention claimed is:

1. A method of preparing a biopolymer product, the method which comprises:
    carbonizing a precursor biopolymer containing heteroatoms in a single stage carbonization process under inert atmosphere at a temperature of no more than 800° C.; and
    providing the biopolymer as a biopolymer extracted from red seaweed or brown seaweed or agar-rich seaweed (agarophytes);
    to form a biopolymer product having an electronically conductive carbonized biopolymer with a content of heteroatoms in the carbonized biopolymer of at least 6 atom %.

2. The method according to claim 1, which comprises performing the carbonizing step at a temperature below a highest temperature level of thermally induced weight loss of the biopolymer detected by thermo-gravimetric analysis.

3. The method according to claim 1, which comprises carbonizing at a temperature between 550° C. and 800° C.

4. The method according to claim 1, wherein an oxygen content in the carbonized biopolymer is at least 6 atom %.

5. The method according to claim 1, wherein a sum of the contents of nitrogen and oxygen in the carbonized biopolymer is at least 8 atom %.

6. The method according to claim 1, wherein a gravimetric capacitance of the carbonized biopolymer is at least 100 F/g.

7. The method according to claim 1, wherein a volumetric capacitance of the carbonized biopolymer is at least 100 F/cm$^3$.

8. A method of preparing a seaweed product, which comprises:
    providing raw seaweed selected from the group consisting of red seaweed, brown seaweed, and agar-rich seaweed (agarophytes); and
    carbonizing the raw seaweed containing heteroatoms in a single stage carbonization process under inert atmosphere at a temperature of no more than 800° C.;
    to form a seaweed product with electrically conductive carbonized seaweed having a content of heteroatoms in the carbonized seaweed of at least 6 atom %.

9. The method according to claim 8, which comprises performing the carbonizing step at a temperature below a highest temperature level of thermally induced weight loss of the seaweed detected by thermo-gravimetric analysis.

10. The method according to claim 8, which comprises carbonizing the seaweed at a temperature between 550° C. and 800° C.

11. The method according to claim 8, wherein an oxygen content of the carbonized seaweed is at least 6 atom %.

12. The method according to claim 8, wherein a sum of the contents of nitrogen and oxygen in the carbonized seaweed is at least 8 atom %.

13. The method according to claim 8, wherein a gravimetric capacitance of the carbonized seaweed is at least 120 F/g.

14. The method according to claim 8, wherein a volumetric capacitance of the carbonized seaweed is at least 100 F/cm$^3$.

15. A method of preparing a biopolymer product, the method which comprises:
    carbonizing a precursor biopolymer containing heteroatoms in a single stage carbonization process under inert atmosphere at a temperature of no more than 800° C.;
    providing the biopolymer as a biopolymer extracted from seaweed;
    selecting the seaweed from the group consisting of Lessonia Nigrescens, Meristotheca Senegalensis, and Hypnea Musciforme;
    to form a biopolymer product having an electronically conductive carbonized biopolymer with a content of heteroatoms in the carbonized biopolymer of at least 6 atom %.

16. A method of preparing a seaweed product, the method which comprises:
    providing seaweed selected from the group consisting of Lessonia Nigrescens, Meristotheca Senegalensis, and Hypnea Musciforme; and
    carbonizing the seaweed containing heteroatoms in a single stage carbonization process under inert atmosphere at a temperature of no more than 800° C.;
    to form a seaweed product with electrically conductive carbonized seaweed having a content of heteroatoms in the carbonized sea weed at least 6 atom %.

* * * * *